UNITED STATES PATENT OFFICE.

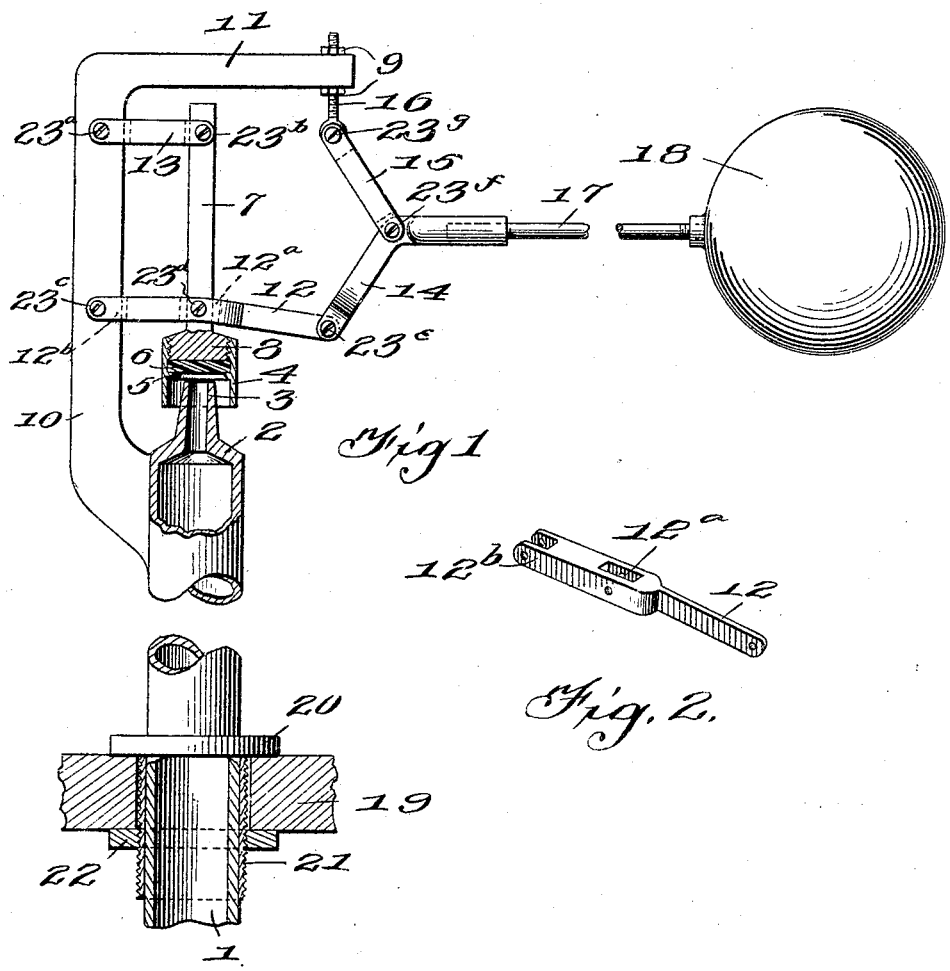

ALBERT D. HERSCHLER, OF ASHLAND, OHIO.

STOP-COCK.

No. 909,409.  Specification of Letters Patent.  Patented Jan. 12, 1909.

Application filed July 2, 1908. Serial No. 441,629.

*To all whom it may concern:*

Be it known that I, ALBERT D. HERSCHLER, citizen of the United States, residing at Ashland, in the county of Ashland and State of Ohio, have invented certain new and useful Improvements in Stop-Cocks, of which the following is a specification.

The object of this invention is to form an automatic stop-cock for flushing tanks, which will be simple in construction, effective in its action, and having a plunger carrying the valve disk which has but little friction and is not subject to corrosion.

The invention is illustrated in the accompanying drawings, in which—

Figure 1 is a side elevation of the stopcock, parts being broken away; and Fig. 2 is a detail of the plunger lever.

Referring specifically to the drawings, in which identical parts are indicated by the same number, 19 indicates a section of the bottom of the water tank, through which the supply pipe 1 extends. A threaded sleeve 21 fits over pipe 1 where it passes through tank 19 and lock nut 22 pulls the flange 20 on the upper end of the sleeve tight against the tank bottom, making a water tight joint and holding the pipe 1 rigidly in place.

The supply pipe 1 has a nozzle 2 at the top terminating in a seat 3, and has an upwardly projecting arm 10 with the upper overhanging part 11.

A stem or plunger 7, with a threaded block 8 at its lower end is mounted centrally above the seat 3. A rubber disk 6 is held to block 8 by the rib 5 in a sleeve 4 which has an inner thread above the rib 5 to screw on the block 8. The lower end of the sleeve prevents the water from splashing as it flows out, and directs it downwardly.

The plunger 7 is mounted in vertical position parallel to the arm 10 by means of a link 13, and a lever 12. Link 13 is pivoted to arm 10 at $23^a$ and to plunger 7 at $23^b$. Lever 12 is pivoted to the arm at $23^c$ and to the plunger at $23^d$. The forked end $12^b$ of the lever fits over arm 10 and the plunger 7 extends loosely through a hole $12^a$ in the lever.

A lever 14 is pivoted to the outer end of the lever at $23^e$ and to a link 15 at $23^f$. This link 15, which supports the lever 14 is pivoted to an eye bolt 16 at $23^g$, the eye bolt being screwed through the end of the overhanging arm 11. A stem 17 is screwed into a socket in the outer end of the lever 14 and this stem carries the ball float 18 which is usually a hollow metal ball.

The nuts 9 allow the eye bolt 16 to be adjusted to bring the disk 6 nearer to or farther from seat 3, as in case disk 6 wears partly away or when a new disk is inserted.

In operation, the float 18 drops downward when the water is let out of the tank. This action raises disk 6 away from seat 3, the lever 14 turning on its fulcrum $23^f$ which opens the cock and allows water to enter tank. As the water fills the tank the float 18 rises and slowly forces disk 6 down until the water supply is shut off.

The manner in which the plunger is supported by parallel links causes the valve disk to seat squarely upon the seat 3. There is no chance for the valve to become stuck from friction or dirt, and the adjustment permitted by the screw 16 allows a good fit to be effected, at the valve.

I claim:

1. The combination of a pipe having a valve seat at the end, a support, a valve and its stem, movable to and from the seat, a link connecting the support and stem, a lever fulcrumed on the support and pivoted to the stem, and a float operatively connected to the lever, to open and close the valve.

2. The combination with a support and a reciprocating valve, of a lever pivoted on the support and connected to the valve stem, a bent lever provided with a float, connected to said lever, and a swinging link pivotally connected to the support and to the bent lever and forming a fulcrum for the latter.

3. The combination with a support and a reciprocating valve, of a lever provided with a float and operatively connected to the valve, a link connected at one end to the lever and forming a fulcrum for the same, and a connection between the other end of the link and the support, adjustable to vary the position of the valve.

4. The combination of a pipe having a valve seat at the end, a support projecting upwardly above the seat and having an arm overhanging the same, a valve and its stem extending upwardly parallel to the support, parallel links connecting the stem and support, one link being extended to form a lever, a bent lever connected at one end to said lever and having a float at the other end, and a link connecting the arm and the bent lever.

In testimony whereof I affix my signature in presence of two witnesses.

ALBERT D. HERSCHLER.

Witnesses:
   JAS. A. RALSTON,
   VIRGIL C. ROFF.